(12) United States Patent
Lou et al.

(10) Patent No.: US 10,773,458 B2
(45) Date of Patent: Sep. 15, 2020

(54) TERAHERTZ INSPECTION FOR ADDITIVELY MANUFACTURED MATERIALS

(71) Applicant: The Boeing Company, Chicago, IL (US)

(72) Inventors: Taisia Tsukruk Lou, Olivette, MO (US); Donald Duane Palmer, Jr., Ballwin, MO (US); Nathan Rylan Smith, Melbourne, FL (US); Shayne Andrew Dorrell, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 253 days.

(21) Appl. No.: 15/887,518

(22) Filed: Feb. 2, 2018

(65) Prior Publication Data
US 2019/0240908 A1   Aug. 8, 2019

(51) Int. Cl.
| | |
|---|---|
| *B29C 64/30* | (2017.01) |
| *G01N 21/3581* | (2014.01) |
| *B33Y 10/00* | (2015.01) |
| *B33Y 30/00* | (2015.01) |
| *B22F 3/105* | (2006.01) |
| *B33Y 50/00* | (2015.01) |
| *B33Y 40/00* | (2020.01) |
| *B33Y 50/02* | (2015.01) |
| *B29C 64/153* | (2017.01) |
| *B29C 64/393* | (2017.01) |
| *G01N 21/3563* | (2014.01) |
| *B29C 64/386* | (2017.01) |

(52) U.S. Cl.
CPC ............ *B29C 64/30* (2017.08); *B22F 3/1055* (2013.01); *B29C 64/153* (2017.08); *B29C 64/393* (2017.08); *B33Y 10/00* (2014.12); *B33Y 30/00* (2014.12); *B33Y 40/00* (2014.12); *B33Y 50/00* (2014.12); *B33Y 50/02* (2014.12); *G01N 21/3563* (2013.01); *G01N 21/3581* (2013.01); *B22F 2003/1057* (2013.01); *B29C 64/386* (2017.08)

(58) Field of Classification Search
CPC ...................................................... B29C 64/30
See application file for complete search history.

(56) References Cited

U.S. PATENT DOCUMENTS

| | | |
|---|---|---|
| 9,108,358 B1 | 8/2015 | Herloski et al. |
| 2017/0217101 A1 | 8/2017 | Kim et al. |

FOREIGN PATENT DOCUMENTS

WO   2016128757 A1   8/2016

OTHER PUBLICATIONS

Hou, H. et al., "High Temperature Terahertz Detectors Realized by a GaN High Electron Mobility Transistor", Scientific Reports, vol. 7 No. 46664, Apr. 21, 2017, pp. 1-6, Scientific Reports.
Anonymous, "Industrial Sticky Shield", pp. 1-3, retrieved on Jul. 12, 2019, retrieved from internet: https://www.heatshieldproducts.com/industrial/industrial-heat-shield-barriers/industrial-sticky-shield.

(Continued)

*Primary Examiner* — Larry W Thrower
(74) *Attorney, Agent, or Firm* — Coats & Bennett, PLLC

(57) ABSTRACT

Apparatuses and systems comprising an additive manufacturing device and an associated terahertz inspection device for inspecting additively deposited layers in real time during or immediately following material deposition and parts made and inspected by the apparatuses and systems and their associated methods are disclosed herein.

21 Claims, 12 Drawing Sheets

(56) References Cited

OTHER PUBLICATIONS

Sizov, F., "Terahertz Radiation Detectors: the State-of-the-Art", Semiconductor Science and Technology, vol. 33 No. 12, Oct. 24, 2018, pp. 1-27, IOP Publishing.
Zheng, X. et al., "Enhancement of Real-Time THz Imaging System Based on 320 X 240 Uncooled Microbolometer Detector", Journal of Infrared, Millimeter and Terahertz Waves, May 30, 2016, pp. 965-976, vol. 37, No. 10.
Iida, H. et al., "Repeatability of Absolute Terahertz Power Measurement using a Sensitive Calorimeter", 39th International Conference on Infrared, Millimeter, and Terahertz Waves, Sep. 14, 2014, pp. 1-2.
Nishi, H., et al., "Si photonic integrated circuit for a compact and stable CW-THz spectrometer", 11th International Conference on Group IV Photonics (GFP), Aug. 27, 2014, pp. 223-224.
Lau, Y. et al, "Millimeter Wave Power Measurement above 110 GHz", 67th ARFTG Conference, Jun. 16, 2006, pp. 97-102, IEEE.

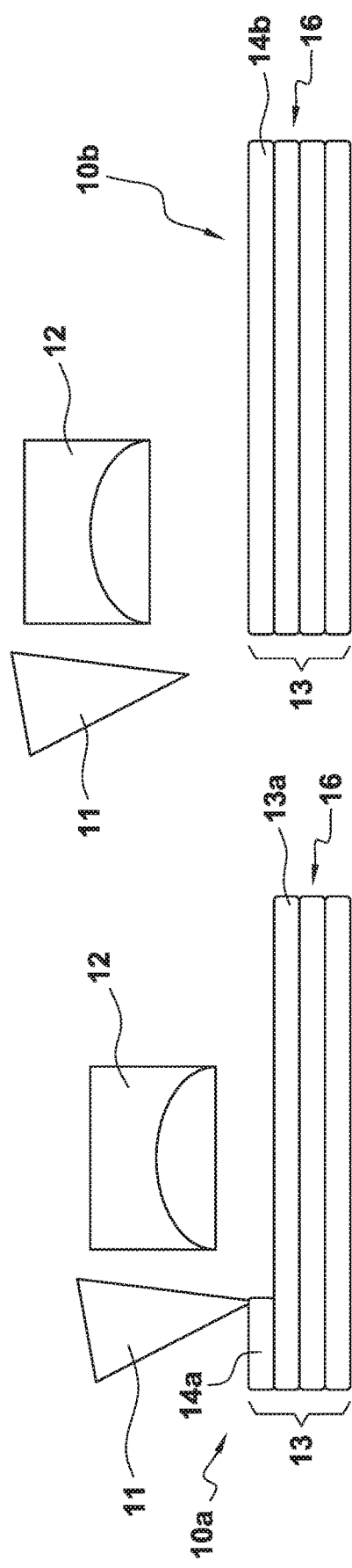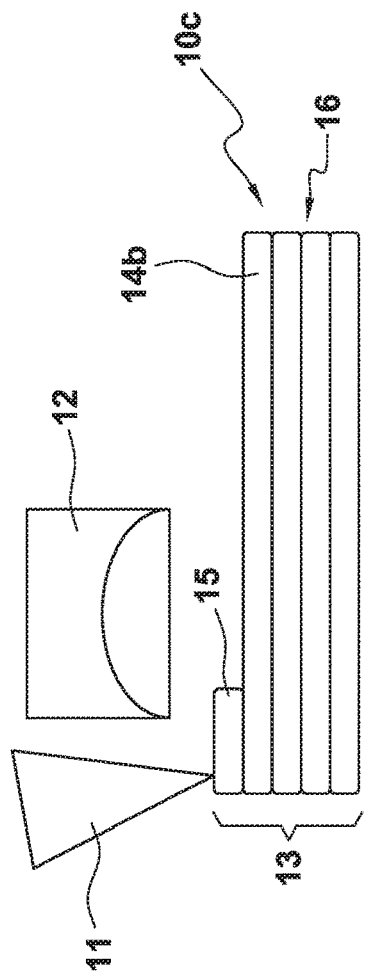

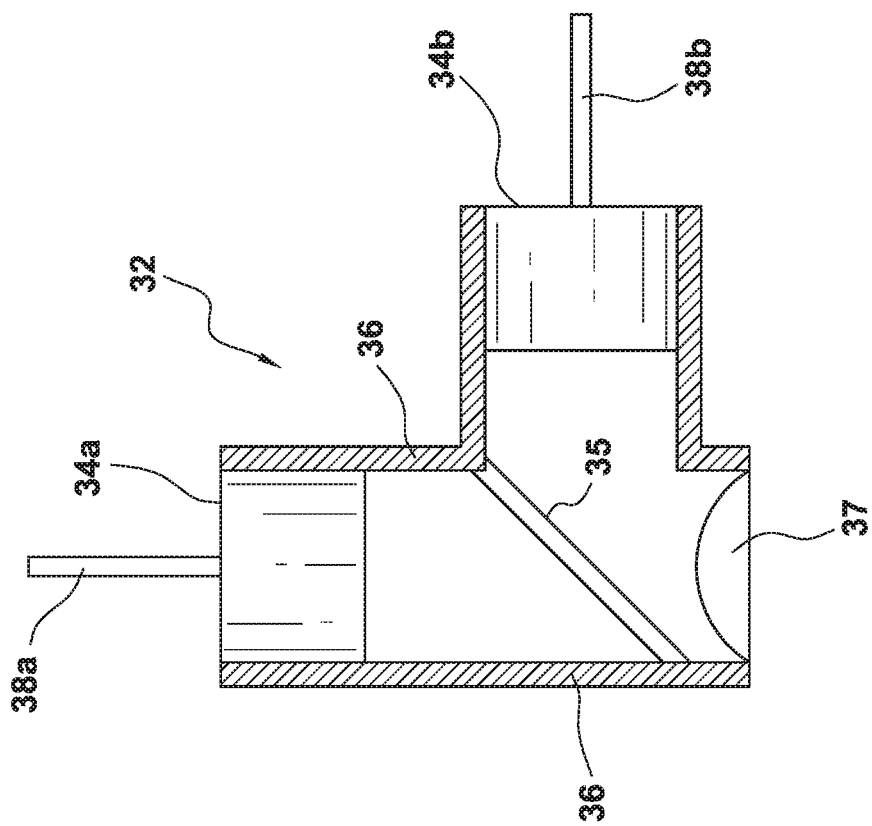
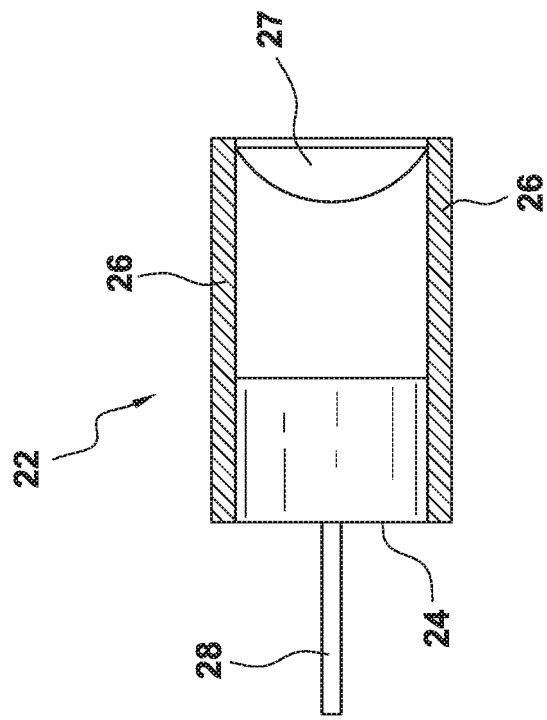
FIG. 3
FIG. 2

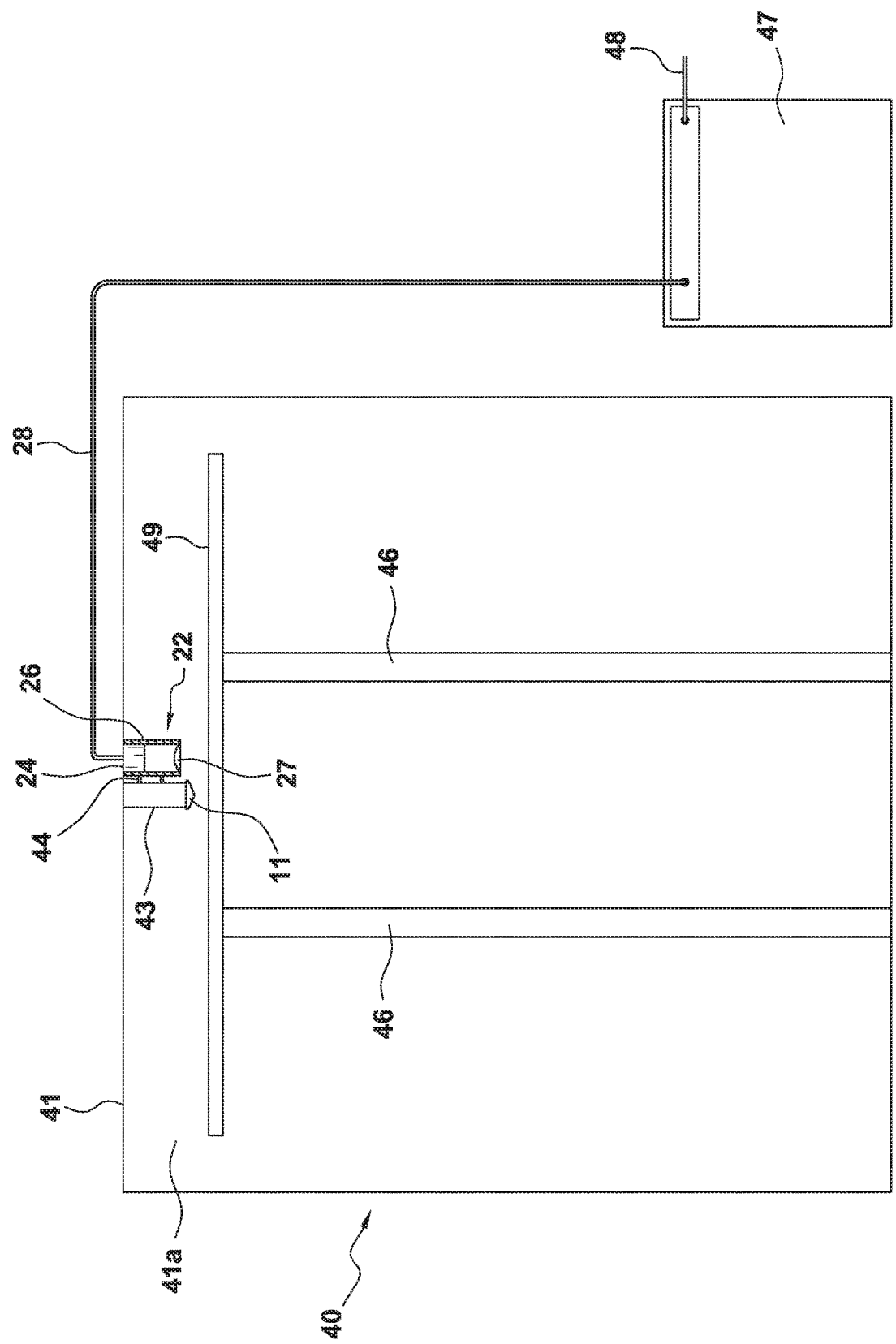

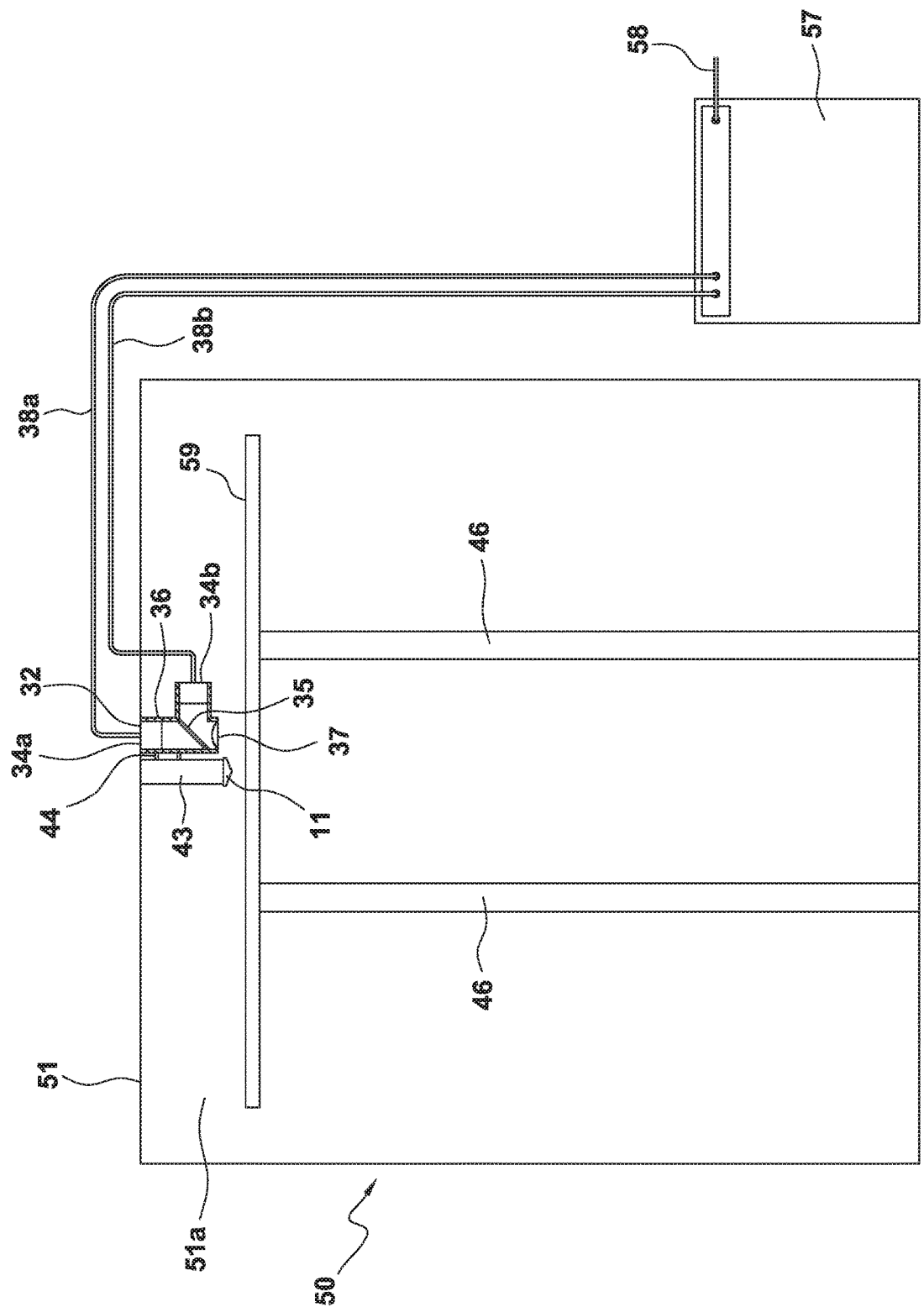

TERAHERTZ INSPECTION FOR ADDITIVELY MANUFACTURED MATERIALS

TECHNOLOGICAL FIELD

The present disclosure relates generally to non-destructive testing methods. More specifically, the present disclosure relates to the use of Terahertz frequencies to non-destructively inspect manufactured parts.

BACKGROUND

Additive manufacturing (equivalently referred to herein as "AM") is the broad term encompassing computer assisted 3-D printing techniques. The term "3-D printing" originally referred to a process that deposits a binder material onto a powder bed with inkjet printer heads layer-by-layer. More recently, the term is being used in popular vernacular to encompass a wider variety of additive manufacturing techniques. United States and global technical standards use the term "additive manufacturing" in this broader sense to connote manufacturing systems for producing three-dimensional (equivalently referred to herein as "3D") parts that are typically first fashioned digitally on a computer. For example, standard ISO/ASTM52900-15 defines seven categories of AM processes within its meaning: binder jetting, directed energy deposition, material extrusion, material jetting, powder bed fusion, sheet lamination and vat photopolymerization.

The field of additive manufacturing has progressed to allow for layer-by-layer deposition of various materials. In many instances, additive manufacturing has proven useful in the manufacture of one-off parts including, for example, parts used as prototypes, or other customized parts that may or may not lead to mass production. However, the use of additive manufacturing techniques to make certain parts (e.g., load-bearing or structural parts) has not been accepted or even approved by certain standards, especially where inspections for quality and safety are required. The lack of accepted inspection techniques for additively manufactured parts, including additively manufactured parts used as load-bearing parts or other structural parts (e.g., additively manufactured parts requiring inspection and certification), has hampered the advancement of additively manufacturing structural parts.

SUMMARY

According to aspects of the present disclosure, apparatuses, systems and methods are presented for the non-destructive inspection of additively manufactured parts in real time during manufacture of the parts using radiation in the Terahertz frequency range.

According to an aspect, the present disclosure is directed to an apparatus comprising an additive manufacturing device including a material deposition head configured to form an additively-manufactured build, with the build comprising individual layers of deposited material, and with the additive manufacturing device comprising a deposition head, and a terahertz inspection device located proximate to the material deposition head. The terahertz inspection device includes a terahertz probe, and further includes a thermal shield that substantially envelops the terahertz probe.

According to another aspect, the present disclosure is directed to a system including a housing, an additive manufacturing device including a material deposition head located within the housing, with the material deposition head configured to deposit a plurality of successive material layers to form an additively manufactured part. The system further comprises a terahertz inspection device including a terahertz probe, with the probe located within the housing and with the probe located proximate to the material deposition head. The probe further includes a thermal shield substantially enveloping the probe.

In another aspect, the terahertz inspection system is configured to non-destructively inspect at least one material layer in substantially real time during the deposit of the at least one material layer.

According to a further aspect, the present disclosure is directed to a method for additively manufacturing a part, the method comprising individually depositing a plurality of material layers from a material deposition head of an additive manufacturing device to form a part. At least one of the individually deposited material layers are non-destructively inspected using terahertz energy. The method further comprises directing terahertz energy from a terahertz inspection device to a location on or within at least one material layer and receiving terahertz energy from at least one material layer and detecting characteristics of the at least one material layer being non-destructively inspected.

In a further aspect, is directed to a method further comprising orienting the terahertz inspection device proximate to the material deposition head and depositing at least one material layer at a temperature ranging from about 300 F to about 450 F. Substantially concurrently with the depositing of the plurality of material layers, at least one material layer is non-destructively inspected in real time and the terahertz inspection device is substantially enveloped in a thermal shield.

Another aspect of the present disclosure is directed to a structural component for a vehicle, including an aircraft, made and inspected according to methods disclosed herein, and an aircraft comprising structural components made and inspected according to methods disclosed herein.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Having thus described variations of the disclosure in general terms, reference will now be made to the accompanying drawings, which are not necessarily drawn to scale.

FIGS. 1A, 1B and 1C are perspective side views of an apparatus and system according to an aspect of the present disclosure.

FIG. 2 is a perspective cross-sectional view of a THz probe used in connection with the apparatuses, systems and methods of the present disclosure featuring a monostatic THz probe orientation.

FIG. 3 is a perspective cross-sectional view of a THz probe used in connection with the apparatuses, systems and methods of the present disclosure featuring a bistatic THz probe orientation.

Figure 4B:
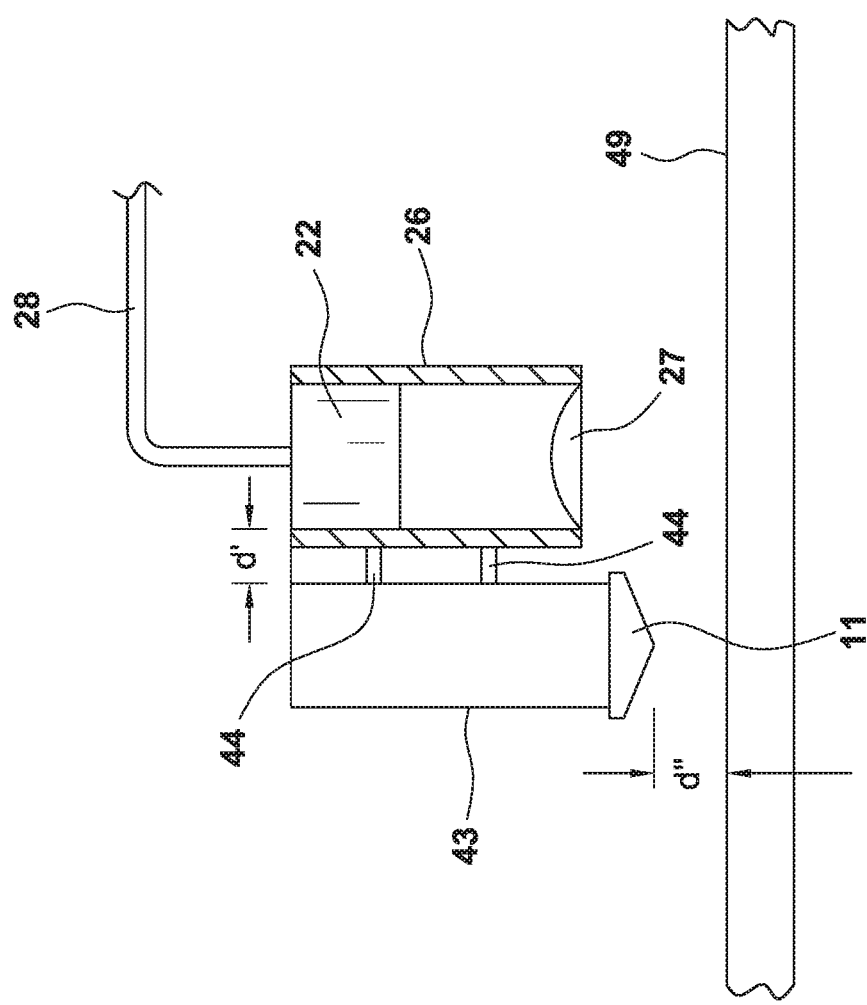

FIGS. 4A and 4B are perspective cross-sectional side views of a system according to an aspect of the present disclosure featuring a monostatic THz probe orientation.

FIG. 4B is an enlarged view of portions of the system shown in FIG. 4A.

Figure 5B:
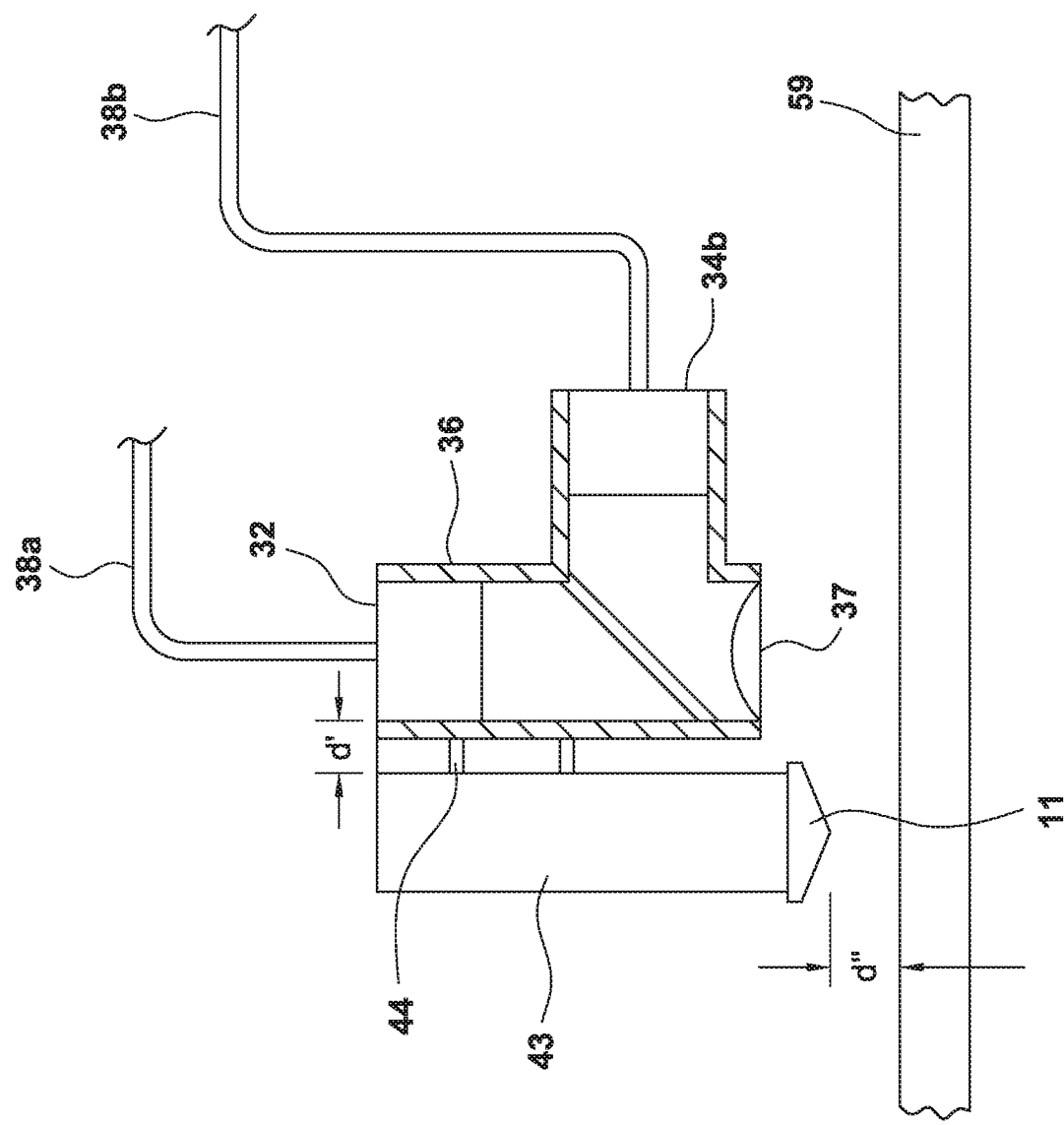

FIGS. 5A and 5B are perspective cross-sectional side views of a system according to an aspect of the present disclosure featuring a bistatic THz probe orientation.

FIG. 5B is an enlarged view of portions of the system shown in FIG. 4A.

Figure 6:
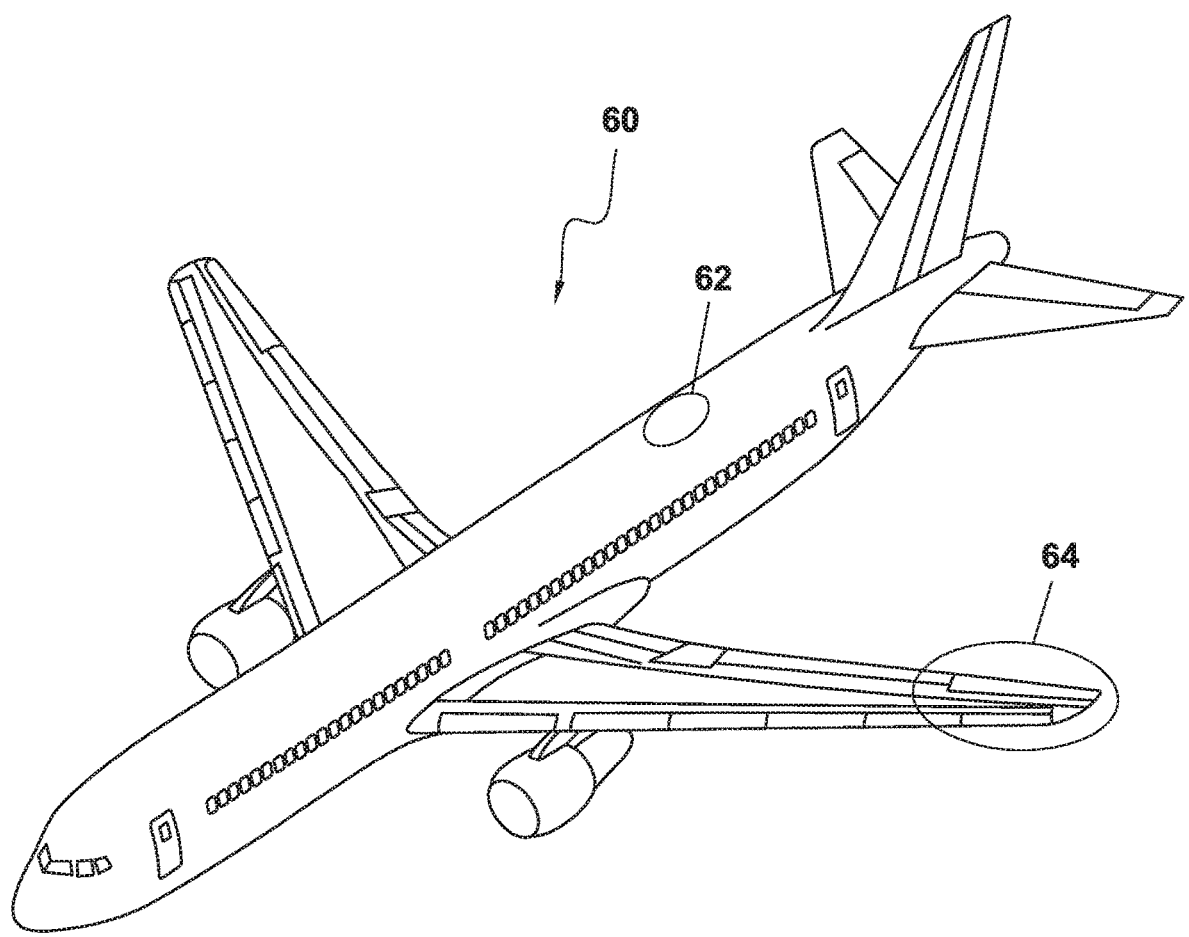

FIG. 6 is a representative illustration of an aircraft, said aircraft comprising structural components made according to aspects of the present disclosure.

Figure 7:
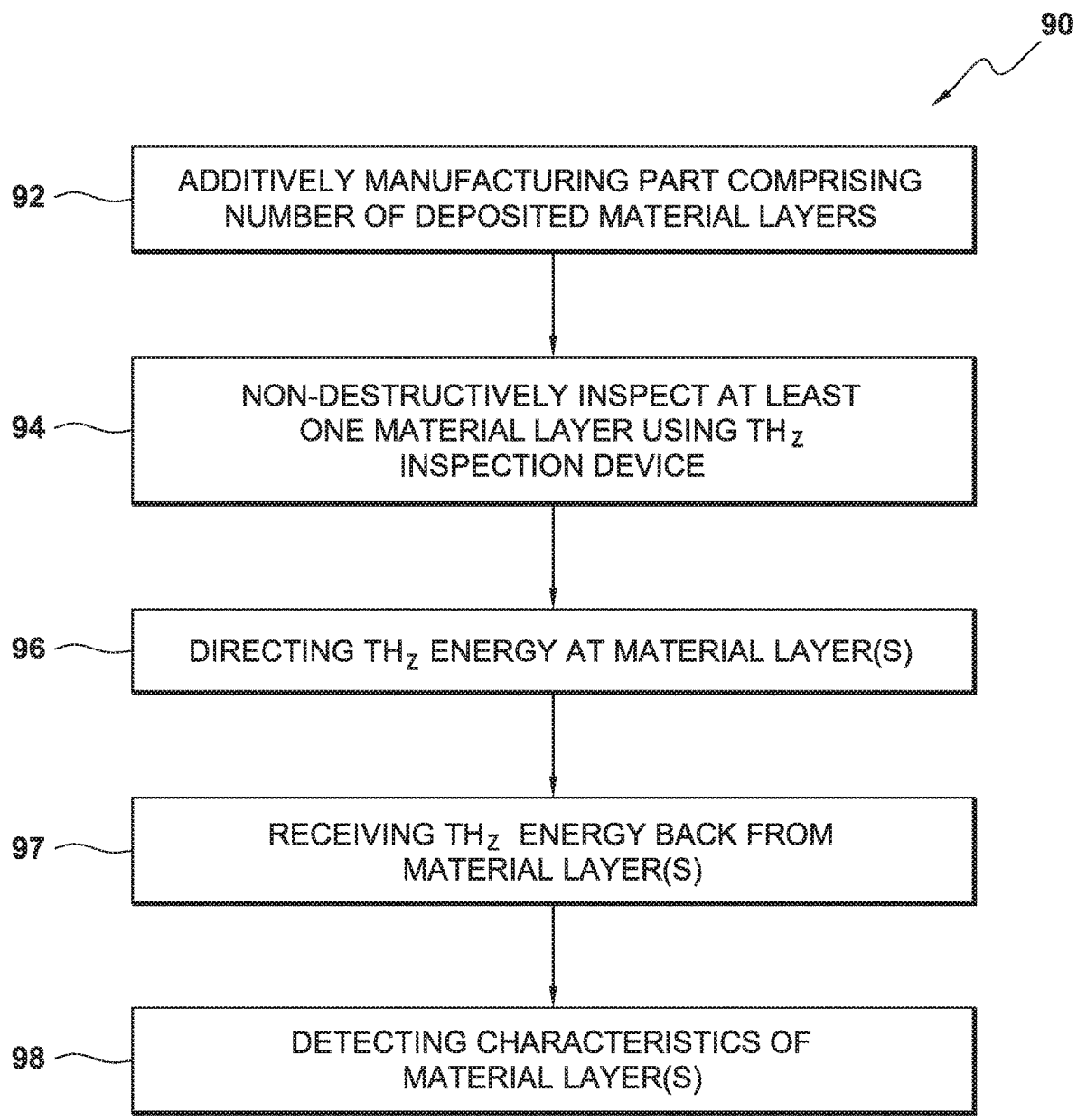
Figure 8:
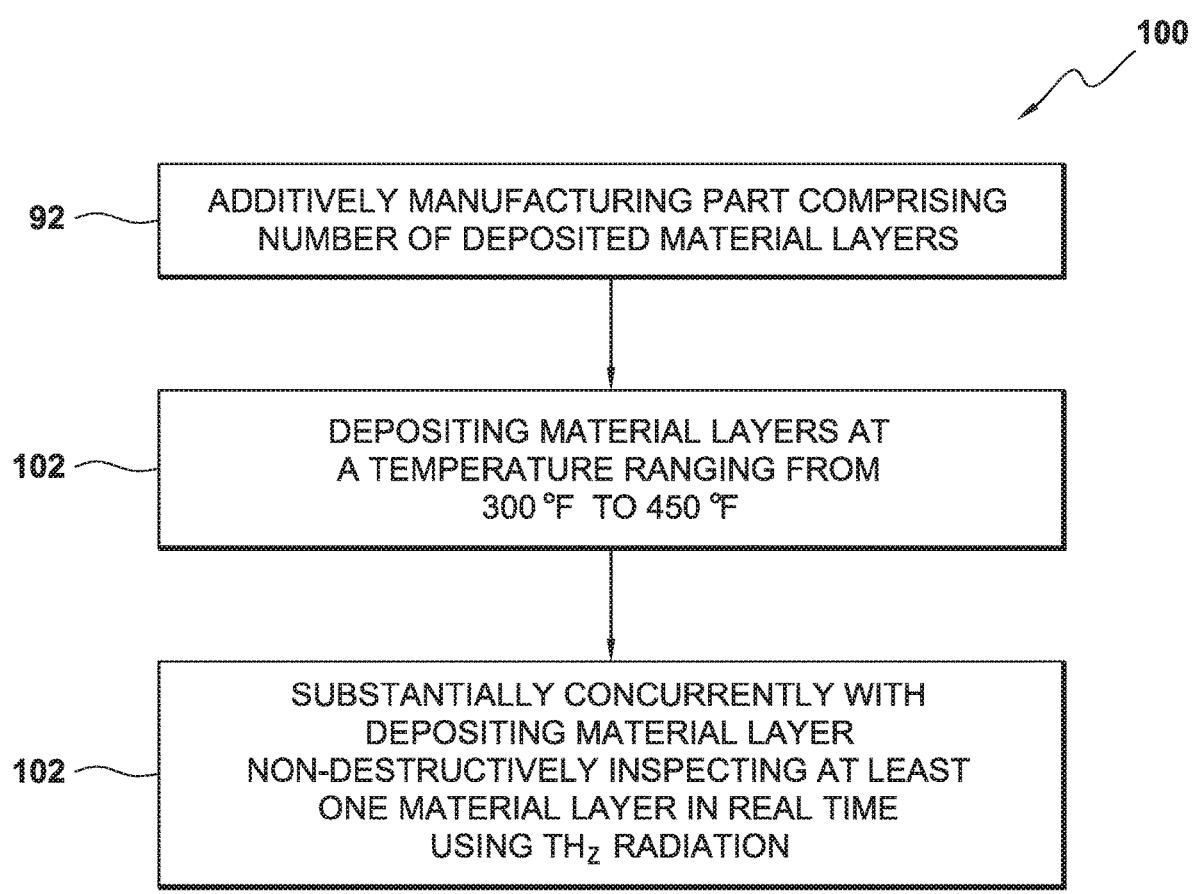

FIGS. 7 and 8 are flowcharts outlining methods according to aspects of the present disclosure.

Figure 9:
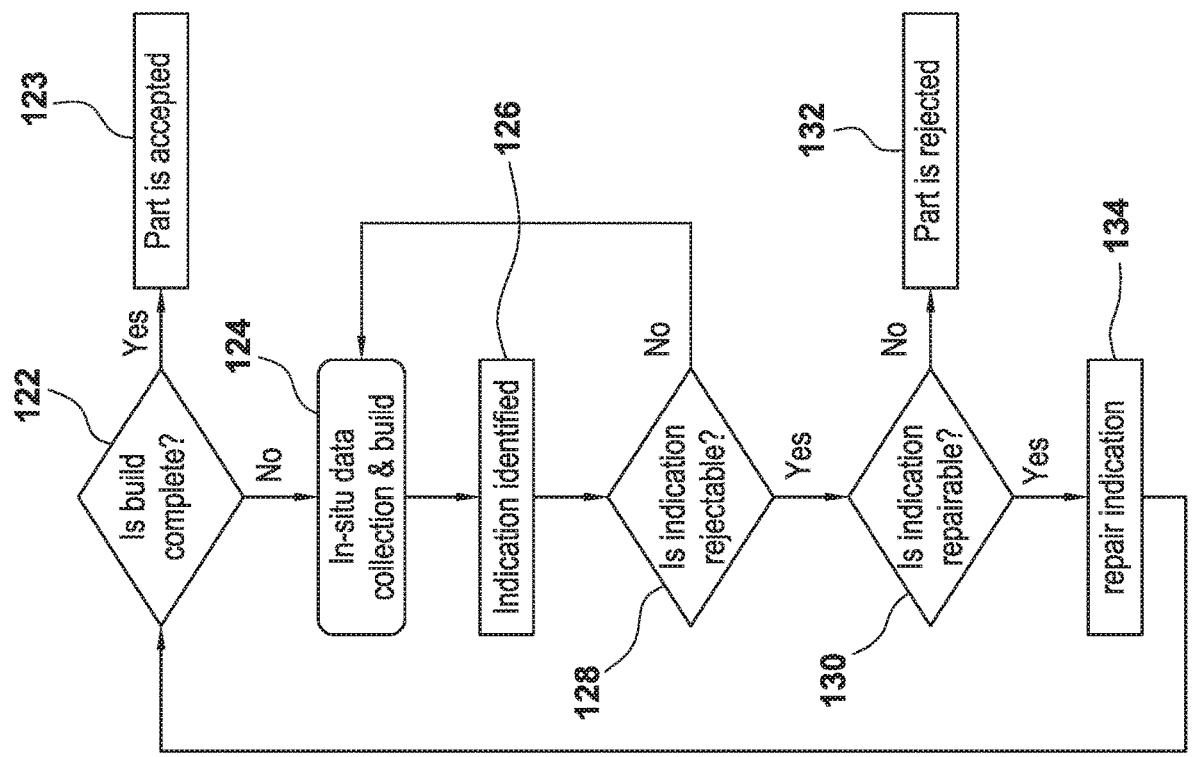
Figure 10:
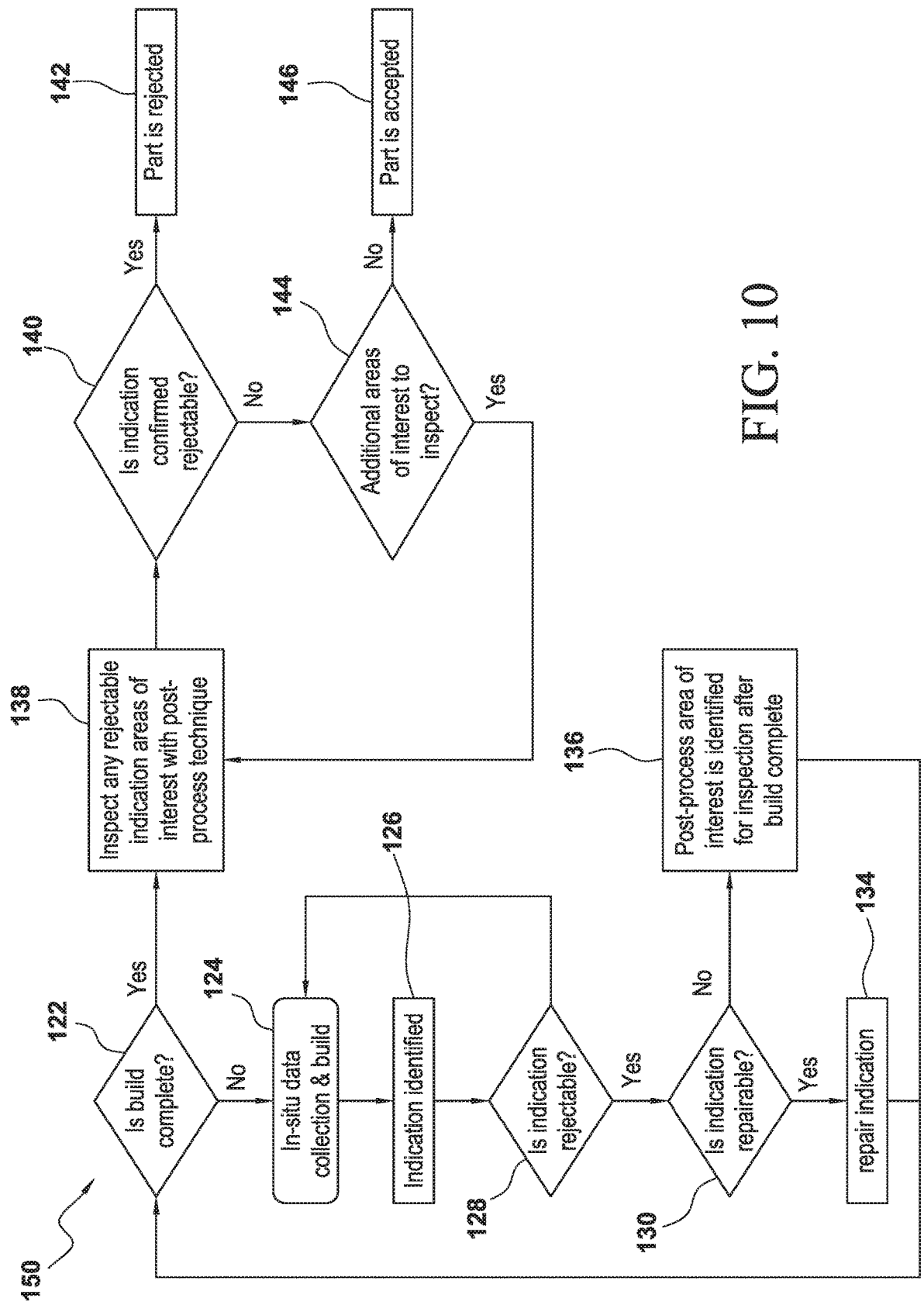

FIGS. 9 and 10 are flowcharts outlining further aspects of the present disclosure.

Figure 11:
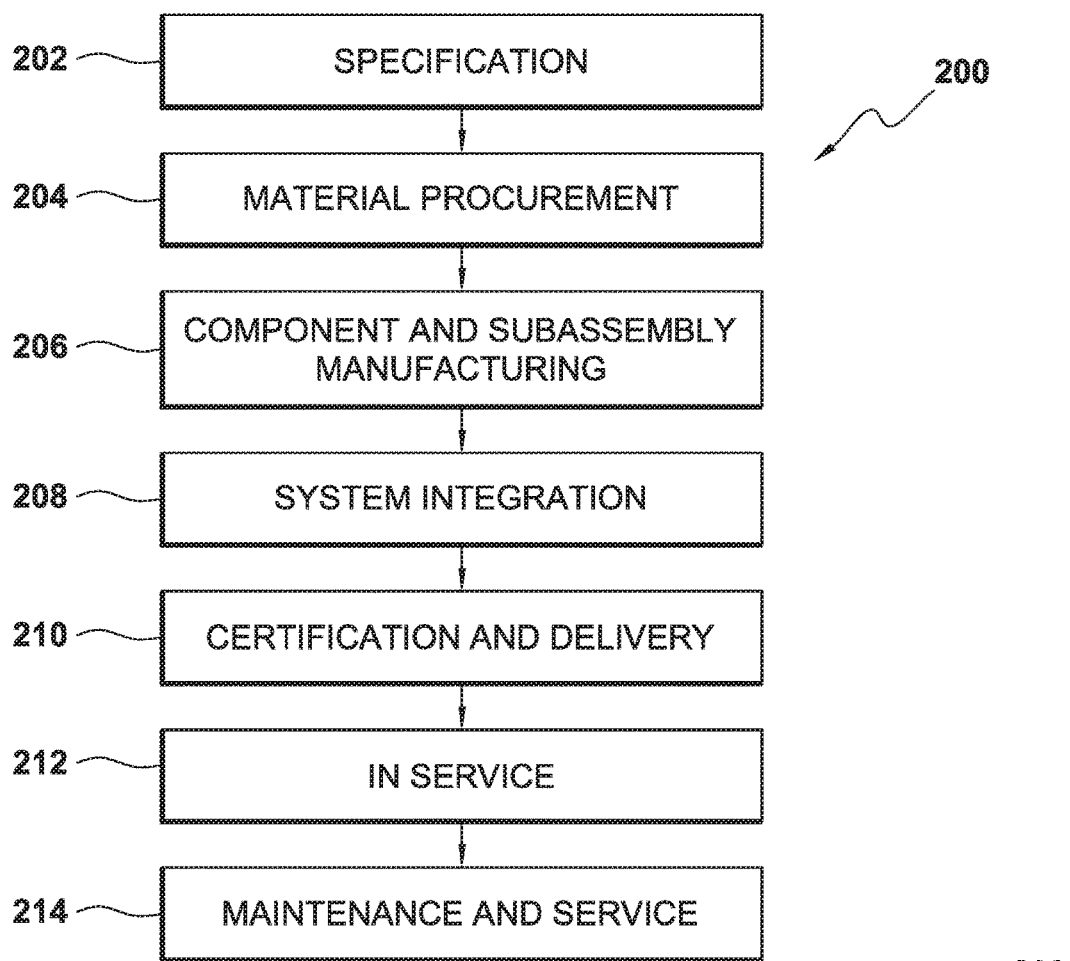

FIG. 11 is a flow diagram of aircraft production and service methodology.

Figure 12:
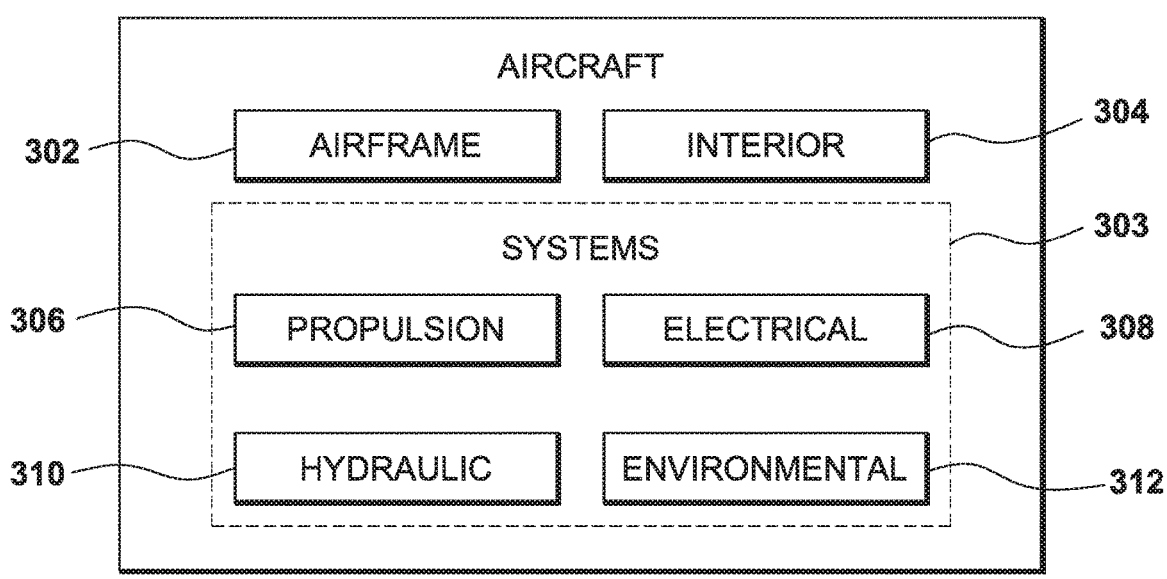

FIG. 12 is a block diagram of an aircraft.

DETAILED DESCRIPTION

The present disclosure is directed to apparatuses, systems and methods for non-destructively inspecting additively manufactured parts in real time using terahertz (referred to equivalently herein as "THz") frequencies delivered from a THz probe positioned proximate to the additive manufacturing material deposition head, with the THz probe housed within a thermal shield encasing, or substantially enveloping, the THz probe.

The THz frequency range refers to electromagnetic waves with frequencies between about 100 GHz and about 10 THz, or wavelengths between about 3 mm and about 30 μm existing in the radiation spectrum between the microwave and infrared regions. The present disclosure uses the terms "THz radiation", "THz energy", and "THz waves" equivalently. Terahertz waves pass through a variety of amorphous and opaque materials with high chemical selectivity, with the ability to image such material under THz interrogation with high definition. As is disclosed herein, non-destructive THz inspection techniques for interrogating dielectric (e.g., non-conducting) materials includes the inspection of composite materials.

According to presently disclosed aspects, such AM processes or "3D manufacturing" processes progressively deposit extremely thin layers of material to create a 3D object from a computer assisted drawing (CAD) file or file formats that include Additive Manufacturing file (AMF) format. Additive manufacturing (AM) is presently understood as referring to processes used to create a three-dimensional (3D) object where layers of material are formed, typically under computer control, to create a manufactured object. Manufactured objects can be of almost any shape or geometry and are produced using digital model data from a 3D model or another electronic data source such as an AMF format. Therefore, compared to removing material from a stock piece, as may be done in a conventional machining process to form a part, 3D printing or AM builds a three-dimensional object from a computer-aided design (CAD) model or an AMF or STL file format by successively adding material layer-by-layer to accurately produce a part having a desired and/or predetermined dimension and/or geometry.

As a result, aspects of the present invention contemplate the use of AM apparatuses, systems and processes to form an AM product (e.g., a part). A non-exhaustive list of such processes includes, without limitation, direct energy deposition; direct metal laser sintering; direct metal printing; electron beam additive manufacturing; electron beam melting; electron beam powder bed manufacturing; fused deposition modeling; fused filament fabrication; indirect powder bed manufacturing; laser cladding; laser deposition manufacturing; laser deposition welding; laser deposition welding/integrated milling; laser engineering net shaping; laser freeform manufacturing; laser metal deposition with powder; laser metal deposition with wire; laser powder bed manufacturing; laser puddle deposition; laser repair manufacturing; powder directed energy deposition; stereolithography; selective laser melting; selective laser sintering; small puddle deposition; or combinations thereof.

Therefore, a large number of additive processes are available. The main differences between the listed processes are in the way that layers are deposited to create parts, and in the materials that are used. Some methods melt or soften the material to produce the layers. For example, in fused filament fabrication (FFF), also known as fused deposition modeling (FDM), the part is produced by extruding small beads or streams of material which harden immediately to form layers. Typically, a filament of thermoplastic material, or metal in the form of metal wire, or other material is fed into an extrusion nozzle head (e.g., a 3D printer extruder, or printer extruder head hereinafter equivalently referred to as a "printer head"), that heats the material and produces a deposit material flow. Another technique fuses parts of the layer and then moves "upward" in the working area, adding successive layers of material, and repeating the process until the piece has "built up" or formed a "build". This process uses the unfused media to support overhangs and thin walls in the part being produced, reducing the need for temporary auxiliary supports for the piece.

In FFF processes, the printing head is moved, under computer control to define a desired build of desired 3D dimensions. Typically, the printer head deposits layers while moving in two dimensions to deposit one horizontal layer at a time before the printer head is directed to a position that is slightly "upward" (e.g., upward from the previously deposited layer) before depositing a subsequent layer onto the build. The speed of the deposition through the print head and the movement of the print head can be controlled to interrupt and re-start material deposition to form a defined interrupted region within a deposited layer.

Laser sintering techniques include, without limitation, selective laser sintering with both metals and polymers, and direct metal laser sintering. Selective laser melting does not use sintering for the fusion of powder granules, but will completely melt the powder using a high-energy laser to create fully dense materials in a layer-wise deposition method that has mechanical properties similar to those of conventional manufactured metals. Electron beam melting is a similar type of additive manufacturing technology for metal parts (e.g. titanium, titanium alloys). EBM manufactures parts by melting metal powder layer by layer with an electron beam in a high vacuum. Another method consists of an inkjet 3D printing system that creates the part one layer at a time by spreading a layer of powder (plaster or resins) and printing a binder in the cross-section of the part using an inkjet-like process. With laminated object manufacturing, thin layers are cut to shape and joined together.

Other methods cure liquid materials using different sophisticated technologies, such as sterolithography. Photopolymerization is primarily used in stereolithography to produce a solid part from a liquid. Inkjet printer systems like the Objet PolyJet system spray photopolymer materials onto a build tray in ultra-thin layers (e.g., between 16 μm and 30 μm) until the part is completed. Each photopolymer layer is cured with UV light after it is jetted, producing fully cured models that can be handled and used without post-curing. Further, ultra-small features can be made with the 3D micro-fabrication technique used in multiphoton photopolymerization. Due to the nonlinear nature of photo excitation, a gel is cured to a solid only in the places where the laser was focused while the remaining gel is removed. Feature sizes of less than about 100 nm can be produced, as well as complex structures that can comprise moving and interlocked parts.

Yet another approach uses a synthetic resin that is solidified using LEDs. In Mask-image-projection-based stereolithography, a 3D digital model is sliced by a set of horizontal planes. Each slice is converted into a two-dimensional mask image. The mask image is then projected onto a photocurable liquid resin surface and light is projected onto the resin to cure it in the shape of the layer. Continuous liquid interface production begins with a reservoir of liquid photopolymer resin. Part of the reservoir is transparent to ultraviolet light, causing the resin to solidify.

In powder-fed directed-energy deposition, a high-power laser is used to melt metal powder supplied to the focus of the laser beam. The powder fed directed energy process is similar to Selective Laser Sintering, but the metal powder is applied only where material is being added to the part at that moment.

Aspects of the present disclosure contemplate the use of FFF and FDM processes, although any of the aforementioned deposition techniques and processes are contemplated. Exemplary FFF and FDM apparatuses used in the contemplated AM processes to manufacture the desire builds include systems capable of depositing material at temperatures up to about 428 F, depending on the desired mechanical properties of the build. According to further contemplated aspects, deposition rates of the deposited layers is controlled to effect a deposition rate ranging from about 4 to about 6 inches/sec.

According to present aspects, a wide variety of materials can be extruded from the printer head of the FFF and FDM apparatuses, including, without limitation, thermoplastics, such as acrylonitrile butadiene styrene (ABS), polyacetic acid, high-impact polystyrene, thermoplastic polyurethane, aliphatic polyamides, polyether ether ketones (PEEKs), as well as composite materials, including ceramics.

According to aspects of the present disclosure, the additive manufacturing and substantially simultaneous THz inspection of deposited layers of composite and other materials including, without limitation, layers deposited via additive manufacturing processes comprising carbon fiber resin materials. Such carbon fiber resin materials supplied to an additive manufacturing device and system include materials supplied as feedstock, for example, in the form of neat resin further comprising fiber particulate material. Further, representative resin materials for use to incorporate carbon fibers and fiber glass-incorporated material systems, according to aspects of the present disclosure include, without limitation and for example, ULTEM 9085, polyetherketoneketone (PEKK), polycarbonate-ABS, polycarbonate, Vero, digital-ABS Plus, FDM Nylon 6; FDM nylon 12 CF; DFM Nylon 12; ULTEM 1010 (Stratasys, Ltd.); PPSF Model (Stratasys, Ltd.) etc.

According to aspects of the present disclosure, THz radiation is emitted from the customized THz inspection device, referred to equivalently herein as a "THz probe", or a THz inspection head". The THz probe is used in conjunction with an additive manufacturing system to non-destructively evaluate AM parts, by inspecting an individual deposited layer or layers in situ, and substantially in real time. Accordingly, the apparatuses, systems and methods of the present disclosure identify abnormalities in the AM parts as the parts are being fabricated, (e.g., during material deposition of each or selected layers, and therefore before completion of the entire part). That is, the THz inspection device is configured to inspect at least one individual layer of deposited material in substantially real time during material deposition. For purposes of the present disclosure the term "substantially in real time" connote a time duration that approximates the time required to deposit a layer from an AM device print head to a build. The precise quantifiable amount of time required to deposit such a layer is dependent on the dimensions of the part being built, as well as many other deposition and manufacturing parameters. However, the aspects of the present disclosure contemplate an inspection, via THz radiation, of an individual layer (or desired number of layers of an AM build) occurring substantially concurrently with the depositing of the individual layer or layers of a build.

In a further aspect, the apparatuses and systems disclosed herein comprise a thermal shield configured to house and substantially envelop the THz probe. The THz probe is oriented proximate to the additive manufacturing material deposition device and head within an additive manufacturing chamber or housing. The additive manufacturing chamber operates at an elevated temperature as successive material layers are deposited.

In a further aspect, in the process of additively manufacturing a part by depositing a number of material layers, the material layers are deposited at a temperature ranging from about 300° F. to about 450° F. and more particularly ranging from about 300° F. to about 428° F. Substantially concurrently with the step of depositing the number of material layers, non-destructive THz inspection of at least one of the material layers is conducted substantially in situ and substantially in real time.

Sensitive inspection instrumentation, including the use of THz probes, can be adversely impacted by significantly elevated temperature environments. This has limited the technology available to non-destructively inspect parts, requiring a delay of the inspection until part manufacturing has been completed. According to aspects of the present disclosure, at least one non-destructive inspection device in the form of at least one THz probe is oriented in situ proximate to the deposition head of an additive manufacturing device while the device operates in an elevated temperature environment (e.g., ranging from about 300° F. to about 450° F.), with the THz probe encased or substantially enveloped in a protective thermal shield.

According to aspects of the present disclosure, the real time inspection of incremental deposited layers of additively manufactured parts using a THz inspection device positioned proximate to the material deposition head facilitates the inspection of an additively manufactured part during a build. The apparatuses, systems, and methods of the present disclosure enable the substantially real time detection of anomalies in an AM layer or layers during the build. In this way, such anomalies can be addressed much sooner in the manufacturing process.

Early detection of such anomalies reduces material waste, obviates part replacement and commensurate cost and potentially increases safety. Further, such early detection can impart required part inspection and quality for AM parts that may enable the certification of AM structural parts used in many industries, including the aircraft and aerospace industries.

FIGS. 1A, 1B, and 1C are schematic representations of stages of an AM process according to aspects of the present disclosure that are utilized to form a part 16. As shown in FIG. 1A, a first stage 10a of an additive manufacturing material deposition process includes a material deposition head 11 oriented proximate to a THz probe 12, with the material deposition head 11 shown depositing a build 13. The build 13 comprises successively deposited individual material layers 13a. As shown in FIG. 10a, a (fourth) partially deposited material layer 14a is being deposited and incorporated into the build 13. FIG. 1B shows a second stage 10b of the process, where the (fourth) partially deposited material layer 14a has now been fully deposited to become a completed deposited material layer 14b included in the build 13. FIG. 1C shows a third stage 10c of the process where a subsequent material layer 15 is being deposited onto material layer 14b, and is adding a layer to the build 13. In operation, material layers are continually added to the build 13 until the part 16 is completed. As shown in FIGS. 1A, 1B, and 1C, the material deposition head 11 is oriented proximate to, and at a predetermined distance from the THz probe. According to an aspect of the present disclosure, the deposition head is oriented at a distance from the THz probe ranging from about 0.5" to about 2.0".

FIG. 2 is a cross-sectional view of a monostatic THz probe 22 showing the THz probe 22 substantially enveloped or encased within a thermal shield 26. Monostatic THz probe 22 is shown in communication with a fiber optic cable 28, although any suitable connection for a THz probe is presently contemplated. Monostatic THz probe 22 further comprises a THz emitter/receiver 24 in communication with fiber optic cable 28. During operation, the THz radiation proceeds from the THz emitter/receiver 24 in the direction of lens 27, and proceeds from the monostatic THz probe 22 to a targeted region of a substrate toward which the monostatic THz probe 22 is directed. In the emitting mode, the emitter/receiver 24 and the lens 27 are constructed or otherwise selected to set a focus and to refract radiation to a predetermined distance from the emitter/receiver 24. In the receiving mode, data is captured by the emitter/receiver 24 as raw waveforms of the THz reflections from the target (not shown in FIG. 2). The inspected target can be a build layer surface or build layer subsurface. According to present aspects, individual build layers can be deposited at average thicknesses ranging from about 0.005" to about 0.020" thick.

As shown in FIG. 2, the outer surface of monostatic THz probe 22 is encased or otherwise substantially enveloped by thermal shield 26. In the monostatic inspection mode, the monostatic THz probe 22 accomplishes both the transmission and receiving functions in a single unit. The thermal shield 26 will not interfere with the monostatic THz probe's ability to emit THz radiation from the probe. The terms "encased", "substantially encased" and "substantially enveloped" refer to a state where the thermal shield 26 encases or surrounds a predominant portion of the monostatic THz probe 22 to an extent where the probe is able to operate in an elevated temperature environment ranging from about 300° F. to about 450° F., and therefore may not completely envelop the monostatic THz probe 22.

FIG. 3 is a cross-sectional view of a bistatic THz probe 32 showing the bistatic THz probe 32 substantially enveloped or encased within a thermal shield 36. In the bistatic arrangement, the THZ probe 32 include a THz emitter 34a and a THz receiver 34b in communication with fiber optic cable 38a and 38b respectively, although any suitable connection for a bistatic THz probe is presently contemplated.

During operation, the THz radiation proceeds from and is emitted by the THz emitter 34a toward and through optical element 35 to the surface or subsurface of the build layer or layers. Optical element 35 as shown can be a one-way mirror such that wavelengths reflected back to probe 22 are directed by optical element 35 to the receiver 34b. As shown, the outer surface of bistatic THz probe 32 is encased or otherwise substantially enveloped by thermal shield 36. In the bistatic inspection mode, the THz probe emitter 34a emits THz radiation directed through the optical element 35 to a target to be inspected (not shown). THz radiation then returns from the target (not shown) into THz probe, where the THz radiation is reflected from optical element 35 to THz receiver 34b. It is recognized that the thermal shield 36 will not interfere with the bistatic THz probe's ability to emit THz radiation from the THz probe emitter 34a and receive THz radiation from a target by the THz receiver 34b. The terms "encased", "substantially encased" and "substantially enveloped" refer to a state where the thermal shield 36 encases or surrounds a predominant portion of the bistatic THz probe 32 to an extent where the probe is able to operate in an environment having an elevated temperature environment ranging from about 300° F. to about 450° F., and therefore may not completely envelop the bistatic THz probe 32.

As shown in the bistatic arrangement shown in FIG. 3, the THz emitter 34a and the lens 37 are constructed or otherwise selected to set a focus and to refract radiation to a predetermined distance from the emitter/receiver 34a. The THz receiver 34b captures data as raw waveforms of the THz reflections from the target (not shown in FIG. 3).

With respect to both the monostatic and bistatic configurations, the inspected target can be a build layer surface or build layer subsurface. According to present aspects, individual build layers can be deposited at average thicknesses ranging from about 0.005" to about 0.020" thick. The raw waveforms are received from the inspected target and processed through filters and data acquisition and interpretation software to evidence differences (e.g., anomalies) between expected and varying results over a targeted surface area. According to aspects of the present disclosure, the software converts the waveforms into an output in the form of, for example, C-scans, B-scans, etc., of targets corresponding to individual build layers in substantially in real time (e.g., viewed or otherwise interpreted on an output "live") relative to the depositing of such individual layers onto the build.

The thermal shield 26, 36 (as shown in FIGS. 2, 3, 4A, 4B, 5A and 5B) that encases, or substantially envelops the THz probe 22, 32 respectively can be made from any suitable material that will protect the THz probe from thermal damage, and that can withstand and protect the THz probe from a thermal environment of an additive manufacturing process, where material deposition and/or curing occurs at temperatures ranging from about 300° F. to about 450° F. or more. Suitable thermal shielding materials include, without limitation, ceramics, silicates (e.g. sodium silicates, potassium silicates, calcium silicates, etc.), carbides (e.g. tantalum carbides, hafnium carbides, etc.), bismaleimides, polyimide resin systems, etc. According to aspects of the present disclosure the thermal shield is made from a material that includes a ceramic material.

The thermal shield 26, 36 can be present at any practical thickness that enables the substantially encased THz probe to function at a required environment that has a temperature that is significantly elevated as compared with an ambient, or room temperature environment. For the purpose of a THz probe operating in situ proximate to a AM printing head and exposed to temperature ranging from about 300° F. to about 450° F., aspects of the present disclosure contemplate a thermal shield thickness ranging from about 0.0625" to about 0.1875" think. The thermal shield is deposited onto or is otherwise attached to the outer surface of a THz probe.

Any material deposition method for depositing the thermal shield onto the outer surface of a THz probe is presently contemplated. Further, the casing or housing of the thermal probe itself may be made from a thermally shielding material. In this aspect, the thermal shield material acts both as a structural part of the THz probe while also acting as a thermal shield, so long as the thermal shield material is robust enough to structurally support and house the components contained in the THz probe.

FIG. 4A is a schematic drawing of an AM system 40 incorporating a monostatic THz inspection device having the monostatic THz probe 22 as shown in FIG. 2. FIG. 4B is an enlarged view of a portion of the system shown in FIG. 4A. As shown in FIG. 4A, an AM system 40 comprises a material deposition chamber housing 41 (hereinafter "housing 41"). A platform 49 onto which a build is manufactured is disposed within a material deposition chamber 41a defined by the housing 41. As shown in FIG. 4A, the platform 49 may be elevated within the housing 41 via a plurality of extendable legs 46. As shown in FIGS. 4A and 4B, the part being manufactured is maintained within a predetermined distance from the material deposition head 11 at a "standoff" distance (d"). According to aspects of the present disclosure, the "standoff" distance (d") ranges from about 0.01" to about 0.1". Housing 41 is temperature controlled such that AM system 40 is configured to operate at elevated temperatures required for the additive manufacture of parts, including composite parts; such operating temperatures ranging from about 300° F. to about 450° F. or more. Additive manufacturing device 43 with material deposition head 11 is positioned proximate to build platform 49.

The monostatic THz probe 22 is positioned proximate to the AM device 43. As shown in FIGS. 4A and 4B, the monostatic THz probe 22 is spaced an "offset" distance (d') from the AM device 43 by spacers 44. According to aspects of the present disclosure, the "offset" distance (d') ranges from about 0.5" to about 2.0". Alternatively, the spacers 44 need not be present in the system 40. In FIGS. 4A and 4B, the monostatic THz probe 22 comprises the features described herein and shown in FIG. 2, including thermal shield 26 encasing or otherwise substantially enveloping the monostatic THz probe 22, and the THz emitter/receiver 24 in communication with fiber optic cable 28, and lens 27.

As shown in FIG. 4A, fiber optic cable 28 is in communication with controller 47. Power cable 48 is shown in communication with controller 47. The power cable 48 engages a power source (not shown). Controller 47 can control and otherwise provide the THz wave source as well as house the data acquisition, signal processing, signal conditioning systems, etc., described herein. If desired, and although not shown in FIG. 4A, the controller 47 can further direct signals to or receive or send signals from a further controller or other device (e.g., a device used to supply signals, receive signals and/or interpret a readout, etc.).

FIG. 5A is a schematic drawing of an AM system 50 incorporating a bistatic THz inspection device comprising the bistatic THz probe 32 as shown in FIG. 3. As shown in FIG. 5, an AM system 50 comprises a material deposition chamber housing 51 (hereinafter "housing 51"). A platform 59 onto which a build is manufactured is disposed within a material chamber 51a defined by housing 51. As shown in FIG. 5A, the platform 59 may be elevated within the housing 51 via a plurality of extendable legs 46 such that the part being manufactured is maintained within a predetermined distance from the material deposition head 11 at a "standoff" distance (d"). According to aspects of the present disclosure, the "standoff" distance (d") ranges from about 0.01" to about 0.1". Housing 51 is temperature controlled such that AM system 50 is configured to operate at elevated temperatures required for the additive manufacture of parts, including composite parts. The remainder of the features presented in the monostatic AM system 40 presented in FIGS. 4A and 4B are present in the bistatic AM system shown in FIGS. 5A and 5B, with the exception that a bistatic THz probe 32 replaces the monostatic THz probe 22 shown in FIGS. 4A and 4B. As shown in FIGS. 5A and 5B, the bistatic THz probe 32 (also shown in FIG. 3) is positioned in situ proximate to the AM device 43. As further shown in FIGS. 5A and 5B, the THz probe 32 is spaced an "offset" distance (d') from the AM device 43 by spacers 44. According to aspects of the present disclosure, the "offset" distance (d') ranges from about 0.5" to about 2.0". Alternatively, the spacers 44 need not be present in the AM system 50. The bistatic THz probe 32 shown in FIGS. 5A and 5B comprises the features shown in FIG. 3, including the thermal shield 36 encasing or otherwise substantially enveloping the THz probe 32. THz emitter 34a and THz receiver 34b are shown in communication respectively with fiber optic cables 38a and 38b.

As shown in FIG. 5A, fiber optic cables 38a and 38b are in communication with controller 57. Power cable 58 is shown in communication with controller 57. Controller 57 can control and otherwise provide the THz wave source as well as house the data acquisition, signal processing, signal conditioning systems, etc. If desired, and although not shown in FIG. 5A, the controller 57 can further direct signals to or receive signals from a further controller or other device (e.g. a device used to supply signals, receive signals, and/or interpret a readout, etc.).

Aspects of the present disclosure find use in a variety of potential applications where composite parts are integrated into the overall manufacture of larger objects including, without limitation, vehicles, particularly vehicles in the aerospace, marine, automotive fields and other applications where lightweight and structurally robust parts are desired. Such objects and vehicles include, for example and without limitation, manned and unmanned aircraft, manned and unmanned spacecraft, manned and unmanned rotorcraft, manned and unmanned terrestrial vehicles, manned and unmanned surface water borne vehicles, manned and unmanned sub-surface water borne vehicles, satellites, etc.

FIG. 6 is a representative illustration of an aircraft 60 comprising components, including structural components that are made according to the additive manufacturing and inspection processes disclosed herein. Aircraft 60 comprises fuselage section 62 and wing section 64.

Vehicles, including aircraft, as well as other structures, comprise many types of structural components that can be manufactured using the additive manufacturing and THz inspection apparatuses, systems and processes of the present disclosure, as well as larger objects that can incorporate such additively manufactured and concurrently inspected THz inspected structural components shown (e.g., AM structural components that are inspected via THz radiation substantially in real time during AM). Such exemplary components shown, as well as others not shown, can be made from additively manufactured materials, including, without limitation, composite materials.

FIGS. 7 and 8 are flowcharts outlining methods according to aspects of the present disclosure. FIG. 7 illustrates a method 90 for additively manufacturing an additively manufactured part including additively manufacturing 92 a part by depositing a number of material layers from a printing head of an additive manufacturing device to form the part. At least one of the material layers is non-destructively inspected 94 by a method comprising directing 96 terahertz energy from the terahertz inspection device to a location on or within at least one material layer and receiving 97 terahertz energy from the at least one material layer component. Characteristics of the at least one material layer are then detected 98.

FIG. 8 shows a method 100 for additively manufacturing an additively manufactured part including additively manufacturing 92 a part by depositing a number of material layers from a printing head of an additive manufacturing device to form the part. The material layers are deposited 102 at an elevated temperature depending upon the requirements of the material(s) being deposited and, for example, at a temperature ranging from about 300° F. to about 450° F. Substantially concurrently with depositing the number of material layers, at least one material layer is non-destructively inspected in real time relative to the material layer deposition, by substantially concurrently with depositing 104 at least one material layer non-destructively inspecting the at least one material layer in real time using THz radiation.

FIGS. 9 and 10 are flowcharts outlining aspects of the present disclosure. A non-destructive inspection protocol 120 using THz radiation to inspect individual or a plurality of deposited AM layers as they are deposited in substantially real time is outlined in FIG. 9. As shown in FIG. 9, during an AM process for the AM manufacture of a secondary structure, a decision is made relative to inspecting a AM deposited build 122. The term "secondary structure" refers to structures including, for example, aircraft structures made from parts, including, without limitation, parts made from and comprising neat resins used to construct, e.g., airplane interior structures. Such secondary structure parts also include, for example, fittings, brackets, housings, etc., presently made from, or otherwise comprising metals. If the build is complete and the part passes THz inspection in substantially real time, the part is accepted 123. Before determining acceptance of the part, in situ THz inspection of the build in substantially real time is conducted 124 and in situ data is collected. Upon detecting a potential anomaly (e.g., an "indication") 126 in a THz inspected build layer or in a plurality of THz inspected build layers, a decision is made regarding the indication and its impact on the build layer 128 and a decision is made regarding rejection of the build layer 128. If it is not necessary to reject such a build layer, the build is allowed to continue, with further data collected in real time during the AM build 124. If the indication is determined to be rejectable 128, a decision is made regarding the nature of the indication relative to repair 130. If such a build layer or layers comprising the indication cannot be repaired, the part is rejected 132. If a repair can be made, the layer comprising the indication is repaired 134, and the build continues 122.

A non-destructive inspection protocol 150 using THz radiation to inspect individual or a plurality of deposited AM layers as they are deposited in substantially real time for the AM manufacture of a primary structure is outlined in FIG. 10. The term "primary structure" refers to structures including, for example, aircraft structures made from parts, including parts made from and comprising neat resins. Such parts are then used to construct large scale components including, for example, ribs, stringers, spars, longerons, etc. If a determination 130 is made that a discovered indication is not reparable, after a build is complete a post-process area of interest is further inspected 136 (e.g. as part of a quality control or other post-processing inspection. In addition, once a build is completed 122, a post-processing inspection is performed of any rejectable indication of interest. An evaluation 140 is performed to determine and confirm whether or not an indication is rejectable. If the indication is confirmed as rejectable, the part is rejected 142. If the indication is not confirmed as rejectable, additional areas of the part may be conducted 144. If no further areas of interest to inspect are identified, the part is accepted 146. If additional areas of interest are identified for inspection, the part is re-evaluated according to boxes 138 through 144, as desired.

Aircraft applications of the disclosed aspects may include, for example, and without limitation, additively manufacturing structural components such as, for example, spars, ribs, stringers, bulkheads, longerons, etc., and substantially concurrent with the additive manufacturing, non-destructively inspecting the AM structural component layers, individually in real time, or inspecting multiple layers, via applying THz energy to the component layers during the manufacturing process.

Referring now to FIGS. 11 and 12, aspects of the disclosure may be used in the context of an aircraft manufacturing and service method 200 and aircraft 300 including at least in the component and subassembly manufacturing 206, system integration 208, maintenance and service 214, in the assembly and maintenance of the aircraft airframe 302, and through aircraft interior 304.

During pre-production, as shown in FIGS. 11 and 12, exemplary method 200 includes specification and design 202 of the aircraft 300 and material procurement 204. During production, component and subassembly manufacturing 206 and system integration 208 of the aircraft 300 takes place. Thereafter, the aircraft 300 may go through certification and delivery 210 in order to be placed in service 212. While in service by a customer, the aircraft 200 is scheduled for routine maintenance and service 214, which may also include modification, reconfiguration, refurbishment, and so on.

Each of the processes of method 200 can be performed or carried out by a system integrator, a third party, and/or an operator (e.g., a customer). For the purposes of this description, a system integrator may include, without limitation, any number of aircraft manufacturers and major-system subcontractors. Further, a third party may include, without limitation, any number of vendors, subcontractors, and suppliers; and an operator may be an airline, leasing company, military entity, service organization, and so on.

As shown in FIG. 12, the aircraft 300 produced by exemplary method 200 can include an airframe 302 with a plurality of systems 303 and an interior 304. Examples of high-level systems 303 include, without limitation, one or more of a propulsion system 306, an electrical system 308, a hydraulic system 310, and an environmental system 312. Any number of other systems can be included. Although an aerospace example is shown, aspects of the present disclosure may be applied to other industries, such as the marine, automotive industries and/or other vehicular industries.

Systems and methods set forth herein may be employed during any one or more of the stages of the production and service method 200. For example, components or subassemblies corresponding to component and subassembly manufacture 206 may be fabricated or manufactured in a manner similar to components or subassemblies produced while the aircraft 300 is in service. Also, one or more apparatuses, methods, or a combination thereof may be used during the production stages 206 and 208, for example, by substantially expediting assembly of or reducing the cost of an aircraft 300. Similarly, one or more of apparatuses, systems, methods, or a combination thereof may be used while the aircraft 300 is in service such as, for example and without limitation, maintenance and service 214 of the aircraft 300.

The disclosed apparatuses, systems and methods for additively manufacturing and concurrently inspecting in real time additively manufactured components, including structural components from various materials (e.g. composite material, etc.) find particular use in vehicles, including manned and unmanned aircraft, manned and unmanned spacecraft, manned and unmanned rotorcraft, manned and unmanned terrestrial vehicles, manned and unmanned surface water borne vehicles, manned and unmanned subsurface water borne vehicles, satellites, etc.

Aspects of the present disclosure can, of course, be carried out in other ways than those specifically set forth herein without departing from essential characteristics of aspects disclosed herein. The presently disclosed aspects are to be considered in all respects as illustrative and not restrictive, and all changes coming within the meaning and equivalency range of the appended claims are intended to be embraced therein.

What is claimed is:

1. An apparatus comprising:
   an additive manufacturing device comprising a material deposition head;
   a terahertz inspection device located proximate to the material deposition head;
      said terahertz inspection device comprising a terahertz probe, said
      terahertz probe comprising a thermal shield substantially enveloping the terahertz probe; and
   wherein the terahertz inspection device comprises a lens, said lens selected to focus terahertz radiation to a predetermined distance from the terahertz inspection device.

2. The apparatus of claim 1, wherein the additive manufacturing device is configured to form an additively manufactured build, said build comprising a plurality of individually deposited layers of material.

3. The apparatus of claim 1, wherein the terahertz inspection device is configured to non-destructively inspect individual deposited layers of material.

4. The apparatus of claim 1, wherein the terahertz inspection device is configured to inspect individual deposited layers of material substantially in real time during the depositing of the material layers.

5. The apparatus of claim 1, further comprising a material deposition chamber, said chamber defined by a housing, and said material deposition chamber configured to house said material deposition device and said terahertz inspection device.

6. The apparatus of claim 1, wherein the material deposition head is oriented within a first distance from the terahertz inspection device, said first distance ranging from about 0.5" to about 2.0".

7. The apparatus of claim 1, wherein the terahertz inspection device comprises a monostatic terahertz probe.

8. The apparatus of claim 1, wherein the terahertz inspection device comprises a bistatic terahertz probe.

9. The apparatus of claim 1, wherein the thermal shield is made from a material comprising at least one of: a ceramic; sodium silicate; potassium silicate; calcium silicate; tantalum carbide; hafnium carbide; a high temperature bismaleimide resin-containing material; a high temperature polyimide containing material; or a fiberglass-containing material.

10. The apparatus of claim 1, wherein the thermal shield is made from a material comprising a ceramic material.

11. A system comprising:
   a housing;
   an additive manufacturing device comprising a material deposition head, said material deposition head located within the housing, said material deposition head configured to deposit a plurality of material layers to form a part;
   a terahertz inspection device located within the housing and further located proximate to the additive manufacturing device, said terahertz inspection device comprising a thermal shield substantially enveloping the terahertz inspection device; and
   wherein the terahertz inspection device comprises a lens, said lens selected to focus terahertz radiation to a predetermined distance from the terahertz inspection device.

12. The system of claim 11, wherein, the terahertz inspection device is configured to non-destructively inspect in substantially real time at least one deposited material layer during or immediately after the deposit of the at least one deposited material layer.

13. The system of claim 11, wherein the plurality of material layers comprises a composite material.

14. The system of claim 11, wherein the additive manufacturing device is in communication with a supply of feedstock material.

15. The system of claim 14, wherein the feedstock material comprises at least one of ULTEM 9085; FDM Nylon 6, FDM Nylon 12CF, DFM Nylon 12, ULTEM 1010; a polyether ketone ketone or a polyphenylsulfone.

16. A method for additively manufacturing an additively manufactured part, the method comprising:
   individually depositing a plurality of material layers from a material deposition head of an additive manufacturing device to form the part,
      said additive manufacturing device comprising:
         an additive manufacturing device comprising a material deposition head;
         a terahertz inspection device located proximate to the material deposition head, said terahertz inspection device comprising a terahertz probe, said terahertz probe comprising a thermal shield substantially enveloping the terahertz probe;
   non-destructively inspecting at least one material layer using terahertz energy, and further comprising:
   directing terahertz energy from a terahertz inspection device to a location on or within the at least one material layer;
   receiving terahertz energy from the at least one material layer;
   detecting characteristics of the at least one material layer; and
   wherein the terahertz inspection device comprises a lens, said lens selected to focus terahertz radiation to a predetermined distance from the terahertz inspection device.

17. The method of claim 16, further comprising:
   orienting the terahertz inspection device proximate to the material deposition head;
   depositing at least one material layer at a temperature ranging from about 300° F. to about 450° F.;
   substantially concurrently with the depositing of the plurality of material layers, nondestructively inspecting at least one material layer in real time; and wherein, said terahertz inspection device is substantially enveloped in a thermal shield.

18. The method of claim 16, further comprising:
detecting characteristics of the at least one material layer in real time during or immediately after depositing at least one material layer onto a build.

19. An additively manufactured part manufactured and inspected according to the method of claim 16.

20. An apparatus comprising:
an additive manufacturing device comprising a material deposition head; and
a terahertz inspection device located proximate to the material deposition head;
said terahertz inspection device comprising a monostatic terahertz probe, said monstatic terahertz probe comprising a thermal shield substantially enveloping the monostatic terahertz probe.

21. An apparatus comprising:
an additive manufacturing device comprising a material deposition head; and
a terahertz inspection device located proximate to the material deposition head;
said terahertz inspection device comprising a bistatic terahertz probe, said bistatic terahertz probe comprising a thermal shield substantially enveloping the bistatic terahertz probe.

* * * * *